(12) United States Patent
Ebert

(10) Patent No.: US 11,198,327 B2
(45) Date of Patent: Dec. 14, 2021

(54) REPLACEABLE REPLACEMENT AXLE SPINDLE

(71) Applicant: James L. Ebert, Huron, OH (US)

(72) Inventor: James L. Ebert, Huron, OH (US)

( * ) Notice: Subject to any disclaimer, the term of this patent is extended or adjusted under 35 U.S.C. 154(b) by 399 days.

(21) Appl. No.: 16/365,179

(22) Filed: Mar. 26, 2019

(65) Prior Publication Data

US 2020/0307311 A1    Oct. 1, 2020

(51) Int. Cl.
*B60B 35/02* (2006.01)
*F16C 3/02* (2006.01)
*B60B 35/04* (2006.01)
*B60B 35/00* (2006.01)

(52) U.S. Cl.
CPC ............ *B60B 35/04* (2013.01); *B60B 35/004* (2013.01); *F16C 3/02* (2013.01); *B60B 2900/541* (2013.01); *F16C 2361/31* (2013.01)

(58) Field of Classification Search
CPC ..... B60B 35/02; B60B 35/04; B60B 35/0004; B60B 35/14; B60B 2900/541; B60B 2900/731; F16C 3/02; F16C 2361/31
See application file for complete search history.

(56) References Cited

U.S. PATENT DOCUMENTS

| 35,083 | A | * | 4/1862 | Cooper | B60B 35/04 |
|---|---|---|---|---|---|
| | | | | | 295/39 |
| 47,723 | A | * | 5/1865 | Hewett | B60B 35/04 |
| | | | | | 295/39 |
| 288,029 | A | * | 11/1883 | Coombs | B60B 35/04 |
| | | | | | 301/129 |
| 678,524 | A | * | 7/1901 | Smith | B60B 35/04 |
| | | | | | 301/134 |
| 5,966,812 | A | * | 10/1999 | Shiets | B23P 6/00 |
| | | | | | 29/402.09 |
| 6,024,418 | A | * | 2/2000 | Ebert | B23K 31/02 |
| | | | | | 301/130 |
| 7,066,690 | B2 | * | 6/2006 | Ebert | B23B 3/24 |
| | | | | | 408/102 |
| 8,939,518 | B2 | * | 1/2015 | Ebert | B60B 35/14 |
| | | | | | 301/132 |
| 10,202,002 | B2 | * | 2/2019 | Carroll | B60B 35/025 |
| 10,828,935 | B2 | * | 11/2020 | Ebert | B60B 35/14 |
| 2021/0053396 | A1 | * | 2/2021 | Ebert | B60B 35/18 |

FOREIGN PATENT DOCUMENTS

| CA | 2576650 C | * | 5/2015 | |
|---|---|---|---|---|
| GB | 129535 A | * | 7/1919 | ......... B60B 27/0057 |

* cited by examiner

*Primary Examiner* — Adam D Rogers
(74) *Attorney, Agent, or Firm* — Vivacqua Crane, PLLC

(57) ABSTRACT

A replaceable replacement spindle assembly for both drive (tractor) axles and trailer axles comprises a spindle and seal ring. The spindle is an elongate cylinder having inner and outer bearing surfaces and a threaded portion at one end. The seal ring is a short annular or tubular component having a circular opening sized to achieve an interference fit on a portion of the spindle adjacent the inner bearing surface. The interfering surfaces of the spindle and the seal ring are complementarily dimensioned and tapered so that the surfaces contact when the spindle is properly positioned in the seal ring. Adjacent the end of the spindle opposite the bearing surfaces and threads is an end region with features such as openings or a channel which receive complementary fasteners such as plugs, short bolts or a through bolt.

20 Claims, 6 Drawing Sheets

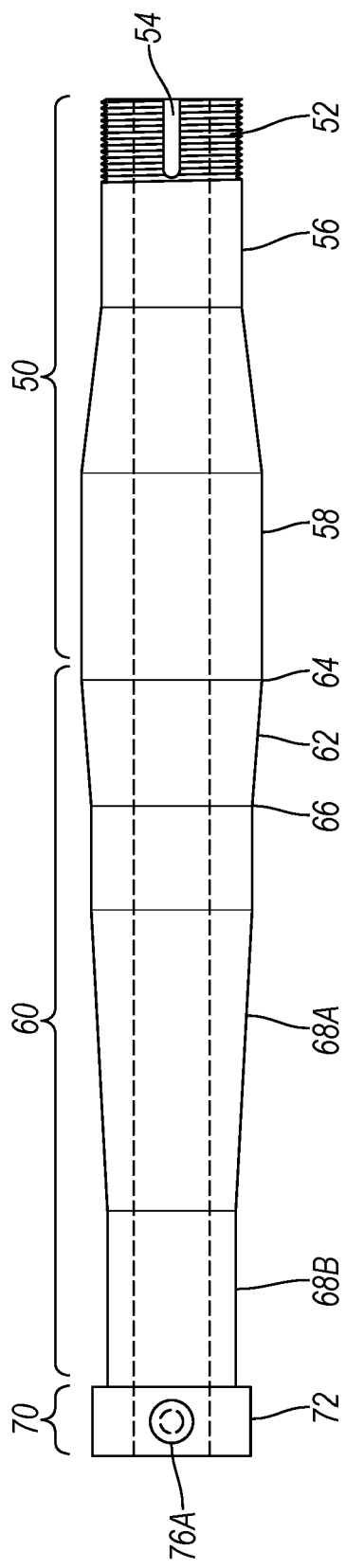
FIG. 2
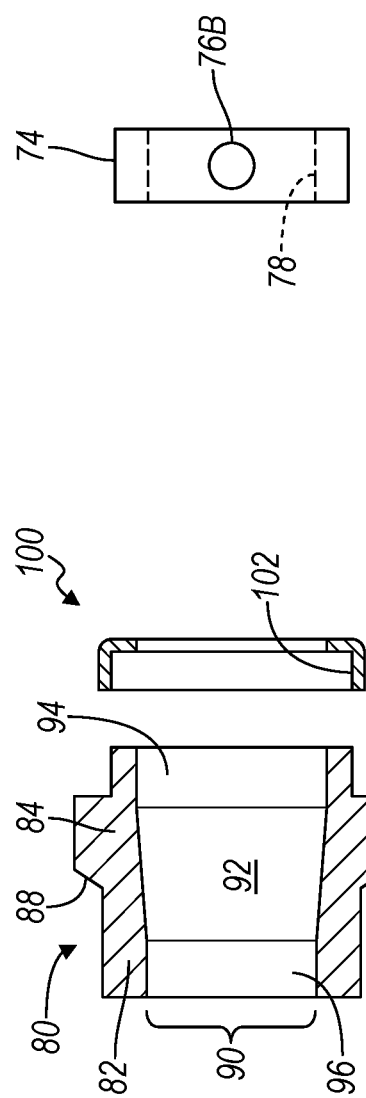
FIG. 4
FIG. 3

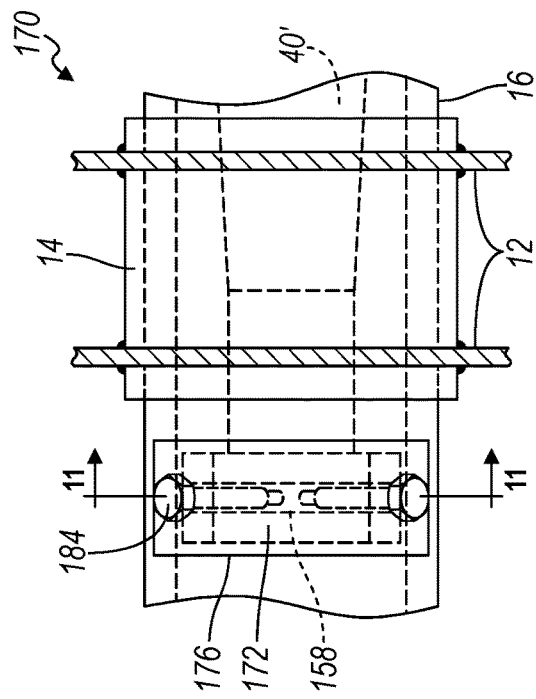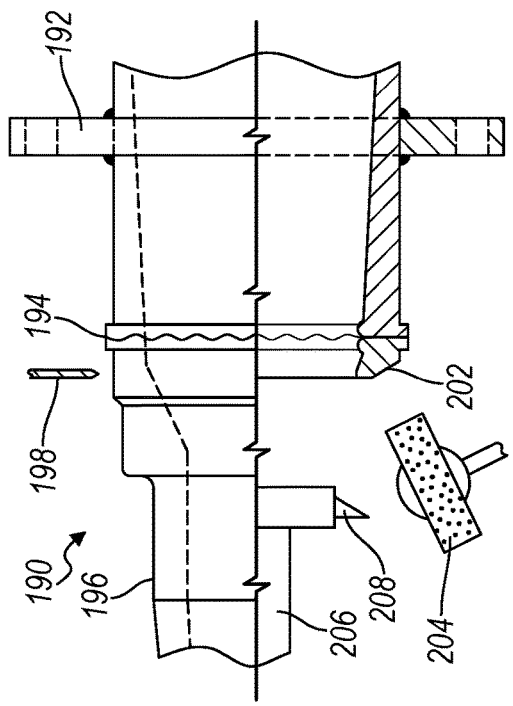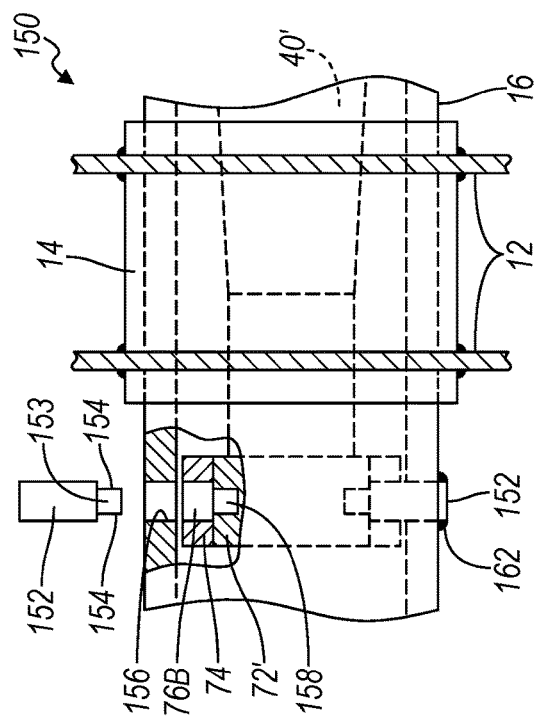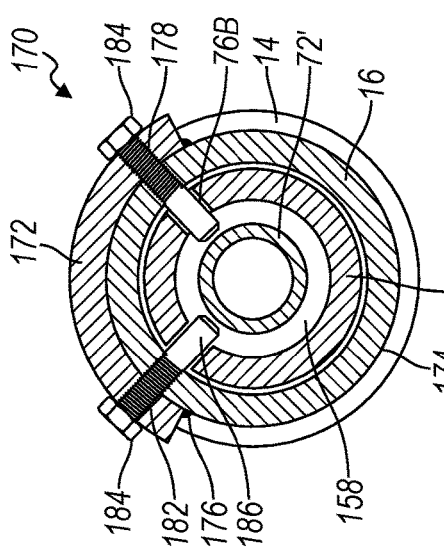

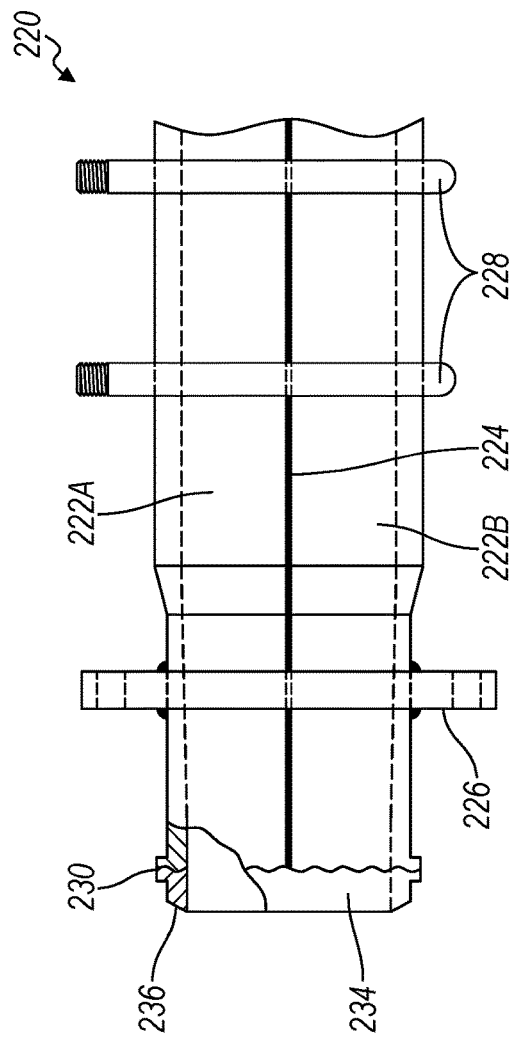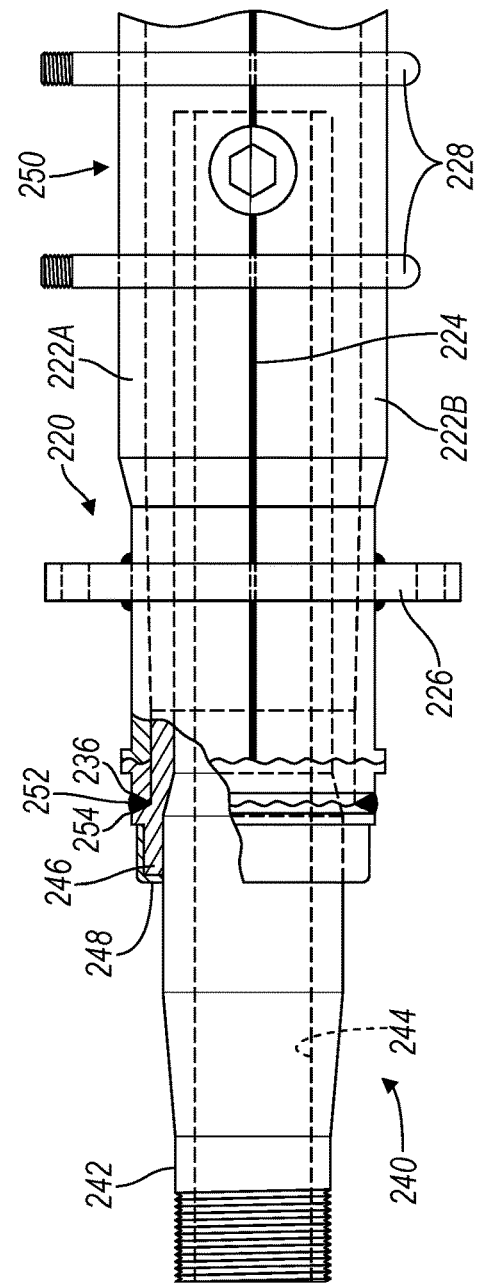

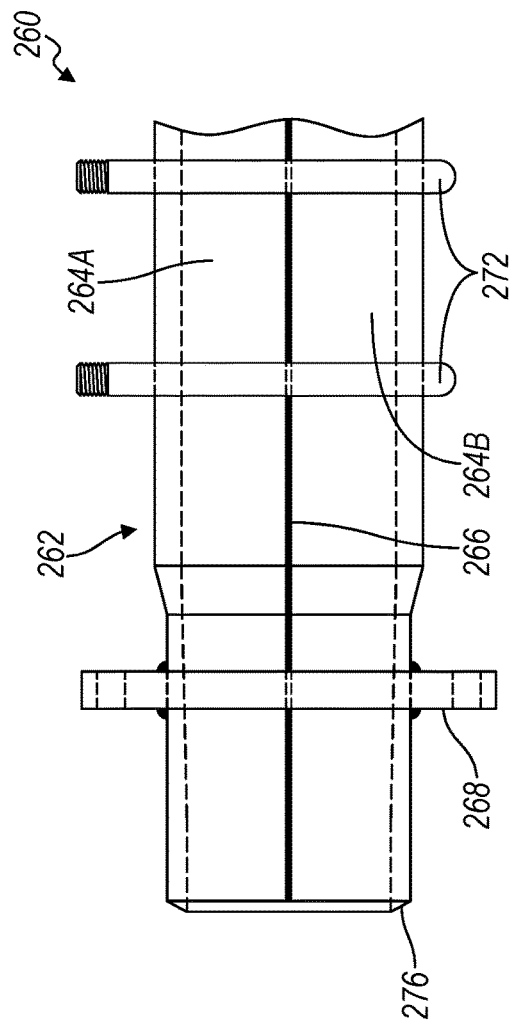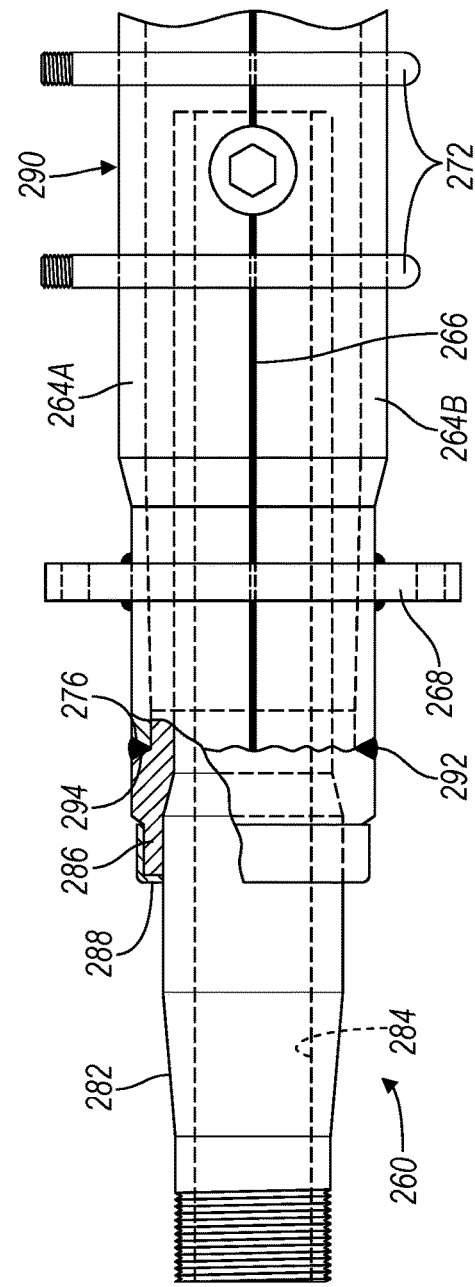

REPLACEABLE REPLACEMENT AXLE SPINDLE

BACKGROUND OF THE INVENTION

The present disclosure relates to replacement spindles for motor vehicle drive and trailer axles and more particularly to replacement spindles for truck (tractor) drive axles and trailer axles which may be readily removed and replaced with a second replacement spindle.

The statements in this section merely provide background information related to the present disclosure and may or may not constitute prior art.

My U.S. Pat. No. 6,024,418 granted Feb. 15, 2000 relates to a unique and improved axle spindle assembly and method for repairing axles of tractors and trailers. The spindle assembly comprises an elongate replacement spindle and an annular sleeve. The annular sleeve is assembled on the spindle and this assembly is inserted into the open end of the axle from which the damaged spindle has been removed. The sleeve is then secured to the axle by a circumferential weld and the inner end of the spindle is secured to the axle by a pair of plug welds. This two piece assembly was developed so that one spindle diameter could be utilized with one of a plurality of different outer diameter sleeves to accommodate different inner axle diameters—the alternative being a multiplicity of specific sizes of spindles that would (1) complement the equally large number of various axle diameters and (2) would greatly increase parts inventory and manufacturing expense.

Notwithstanding the often extended service life of long haul tractors and trailers, which may accumulate hundreds of thousands of miles over their lifetimes, it is uncommon for a tractor or trailer axle spindle, once it has been replaced by, for example, the apparatus and method in my above-referenced patent, to require replacement.

While current replacement spindles, seal rings, liners and repair methods achieve their intended purpose, there is a need for an improved spindle assembly and method which facilitate replacement of a previously replaced axle spindle.

BRIEF SUMMARY OF THE INVENTION

A replaceable replacement spindle assembly suitable for both drive (tractor) axles and trailer axles comprises a generally elongate spindle and a seal ring. The spindle is an elongate cylinder having inner and outer bearing surfaces and a threaded portion at one end. The seal ring is a shorter annular or tubular component having a circular opening sized to achieve an interference fit on a portion of the spindle adjacent the inner bearing surface. The interfering surfaces of the spindle and the seal ring are complementarily tapered and dimensioned so that the surfaces contact when the spindle is disposed in the seal ring. Adjacent the end of the spindle opposite the bearing surfaces and threads is a collar or end portion with a female or re-entrant feature such as a channel or openings which are preferably, though not necessarily, diametrically aligned, threaded and which may receive plugs, a pair of short bolts or a through bolt mounted on and through the walls of the axle.

The repair process includes the steps of removing the damaged spindle from the axle by a conventional process such as cutting. The end of the axle is then ground to a reasonably smooth chamfered surface. Depending upon the axle configuration and condition, it may then be necessary to bore the inner diameter of the axle to true it, enlarge it or both to receive the seal ring. The circular opening in the seal ring includes a tapered surface having a slightly larger diameter toward the outboard end of the axle and a slightly smaller diameter toward the inboard end of the axle. The replacement spindle includes a complementarily dimensioned and tapered surface, as noted above, which achieves an interference fit with the tapered surface of the seal ring.

Since the seal ring defines an interference fit with the spindle, it must first be heated and then installed on the spindle from the inboard (tail) end. When the seal ring is heated and installed, the complementary tapered surfaces align, limit axial translation and properly position the seal ring on the spindle. Next, the sleeve or liner is installed on the inboard end of the spindle, the features or openings in the liner and spindle end are aligned and the liner is tack welded to the spindle to maintain it in position during installation. This assembly is then installed in the axle. If the seal ring is sized to provide an interference fit in the axle, the axle is heated before such installation. Either before or after such installation, openings may be drilled or torch cut in the axle which align with the channel or openings disposed in the liner and the collar or inboard end of the spindle. A through bolt, a pair of threaded fasteners, plugs or similar fasteners are then installed to inhibit rotation and translation of the spindle within the axle. A circumferential weld between the end of the axle and a shoulder of the seal ring secures the seal ring and spindle within the axle.

A further manner of securing the inner end of the spindle to the axle utilizes plug welds such as described in my U.S. Pat. No. 8,939,518 which is hereby incorporated by reference.

It will be appreciated and should be understood that if the replacement spindle of the present invention requires replacement, all that is required is the removal of the threaded bolt(s), plugs, plug welds or fasteners and removal of the spindle from the seal ring by a conventional hydraulic tool, as there are no permanent features that secure the spindle to the seal ring and axle that must be removed.

Thus it is an aspect of the present invention to provide a replaceable replacement spindle assembly for tractor and trailer axles.

It is a further aspect of the present invention to provide a replacement spindle assembly for tractor and trailer axles that may be readily replaced.

It is a still further aspect of the present invention to provide a replaceable replacement spindle assembly comprising an elongate spindle having bearing surfaces and a threaded end portion and an annular seal ring, the spindle and the seal ring having complementarily tapered surfaces.

It is a still further aspect of the present invention to provide a replaceable replacement spindle assembly comprising an elongate spindle having bearing surfaces and a threaded portion adjacent a first end and openings or a channel adjacent a second end and an annular seal ring, the spindle and the seal ring having complementarily tapered surfaces.

It is a still further aspect of the present invention to provide a replacement spindle assembly for tractor and trailer axles comprising an elongate spindle having bearing surfaces and a threaded portion adjacent an outer end and a female feature such as a pair of openings or a channel adjacent an inner end and an annular seal ring, the spindle and the seal ring having complementarily tapered surfaces.

It is a still further aspect of the present invention to provide a replacement spindle assembly for tractor and trailer axles comprising an elongate spindle having bearing surfaces and a threaded portion adjacent a first end and openings adjacent a second end, at least one fastener for securement through the axle and into the openings and an annular seal ring, both the spindle and the seal ring having complementarily tapered surfaces.

It is a still further aspect of the present invention to provide a replacement spindle assembly for tractor and trailer axles comprising an elongate spindle having bearing surfaces and a threaded portion adjacent an outer end and a pair of openings or a channel adjacent an inner end, at least one fastener for disposition through the axle and into the openings or channel and an annular seal ring, both the spindle and the seal ring having complementarily tapered surfaces.

Further aspects, advantages and areas of applicability will become apparent from the description provided herein. It should be understood that the description and specific examples are intended for purposes of illustration only and are not intended to limit the scope of the present disclosure in any way.

BRIEF DESCRIPTION OF THE DRAWINGS

Likewise, the drawings described herein are for illustrative purposes only and are not intended to limit the scope of the present disclosure in any way.

FIG. 2 is a side, elevational view of an exemplary embodiment of a replacement spindle for a trailer axle according to the present invention;

FIG. 3 is a full, sectional view of an exemplary embodiment of a seal ring and wear band for a trailer axle according to the present invention;

FIG. 4 is a side, elevational view of an annular liner or sleeve according to the present invention;

FIG. 9 is a fragmentary, top plan view with portions broken away of a fourth embodiment of an inboard (inner) end portion and fasteners of a replacement spindle assembly according to the present invention;

FIG. 10 is a fragmentary, top plan view of a fifth embodiment of an inboard (inner) end portion and fasteners of a replacement spindle assembly according to the present invention;

FIG. 11 is a full, sectional view of the fifth embodiment of an inboard (inner) end portion and fasteners of a replacement spindle assembly according to the present invention, taken along line 11-11 of FIG. 10;

FIG. 12 is a fragmentary, side elevational view in half section of the initial steps of a repair method according to the present invention;

FIG. 13 is a side, elevational view with a portion broken away of an exemplary embodiment of a drive axle housing prepared for installation of a replacement spindle according to the present invention;

FIG. 14 is a side, elevational view with a portion broken away of an exemplary embodiment of a drive axle housing after a replacement spindle and short seal ring have been installed according to the present invention;

FIG. 15 is a side, elevational view with a portion broken away of an alternate embodiment of a drive axle housing prepared for installation of a replacement spindle according to the present invention; and FIG. 16 is a side, elevational view with a portion broken away of an alternate embodiment of a drive axle housing after a replacement spindle and long seal ring have been installed according to the present invention.

DETAILED DESCRIPTION

The following description is merely exemplary in nature and is not intended to limit the present disclosure, application, or uses.

Figure 1:
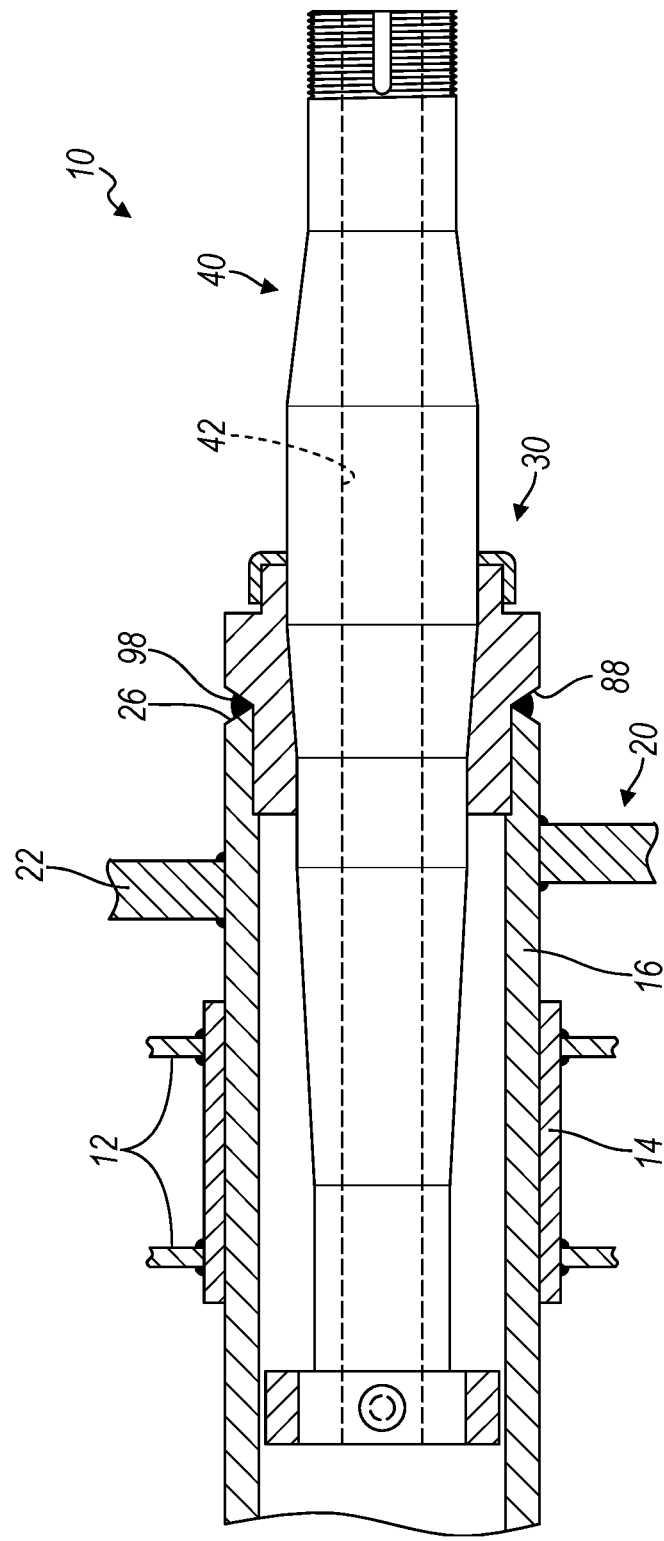
FIG. 1 is a fragmentary, full sectional view of a portion of a typical trailer axle and suspension assembly including the present invention.

Referring to FIG. 1, a portion of a typical and conventional trailer suspension system and axle incorporating the present invention is illustrated and generally designated by the reference number 10. The suspension system and axle assembly 10 includes a U-shaped pivoted trailing arm having vertically oriented, parallel sidewalls 12. A transverse hollow tube 14 engages and extends beyond the parallel sidewalls 12 of the trailing arm and is welded thereto. The hollow tube 14, in turn, receives a circular portion 16 of an axle 20. On the outboard side of the outer trailing arm sidewall 12, to the right in FIG. 1, is disposed a spider plate 22 which supports brake components (not illustrated). In FIG. 1, a damaged terminal portion (not illustrated) of the axle 20 has been removed and the end of the axle 20 has been machined or ground to an oblique, chamfered or frusto-conical surface 26 having a reasonably smooth finish with an angle of between approximately 20 and 25 degrees to the axis of the axle 20, and preferably 22.5 degrees. A replacement spindle assembly 30 according to the present invention has been installed in the axle 20.

Referring now to FIGS. 1, 2, 3 and 4, the replacement spindle assembly 30 includes an elongate replacement spindle 40 and an annular seal ring 80 which receives and achieves an interference fit on the replacement spindle 40. The replacement spindle 40 defines a first (outer) end portion or region 50, an intermediate portion or region 60 and a second (inner) end portion or region 70. The elongate, cylindrical spindle 40 is preferably, though not necessarily, hollow and defines a through axial opening or passageway 42. To maintain lubrication in the axle bearings, a resilient plug (not illustrated) may be disposed in the terminus of the passageway 42. Such an opening or passageway 42 is advantageous in that it achieves significant weight reduction relative to a solid spindle. Moreover, if the axle 20 is a drive axle of a tractor, it will necessarily be hollow to receive a drive shaft (not illustrated).

The first end portion or region 50 include male threads 52, and a keyway 54 at its terminus, a first, outer bearing surface 56 and an axially spaced apart second, inner bearing surface 58. Generally speaking, and as illustrated in FIGS. 1 and 2, the diameter of the outer bearing surface 56 is smaller than the diameter of the inner bearing surface 58. Certain axles, however, have inner and outer bearing surfaces of the same diameter and it should be understood that replacement spindles having equal diameter inner and outer bearing surfaces are compatible with and entirely within the scope of this invention.

The intermediate portion or region 60 includes a first, axially shorter, tapered region or surface 62 proximate the inner bearing surface 58. An outer end 64 of the tapered region or surface 62 proximate the inner bearing surface 58 defines the larger diameter and an inner end 66 of the tapered region or surface 62 distant the inner bearing surface 58 defines the smaller diameter. The difference in diameters is preferably approximately several (ten to twenty) thousandths of an inch, although it may be greater. In FIG. 2, the angle of the tapered region or surface 62, as well as its length, have been enhanced to improve the clarity of and facilitate understanding of this feature of the invention.

The intermediate portion or region 60 also preferably includes a first tapered portion 68A and a second straight portion 68B which together extend from the end 66 of the tapered region 62 to the second (inner) end portion or region 70 which includes a large diameter collar 72. The tapered portion 68A and the straight portion 68B exist solely as weight saving features. Accordingly, an alternate, heavier configuration of the spindle 40 replaces the portions 68A and 68B with a straight section extending from the end 66 of the tapered region or surface 62 having a diameter the same as the diameter of the collar 72. In such a configuration, the large diameter collar 72 would not be apparent but its function would be performed by the end region 70 of the spindle 40. Depending upon the inside diameter of the axle 20 and the diameter of the collar 72, or the end portion or region 70 of the spindle 40 if no reduced diameter tapered portion 68A and straight portion 68B are present, an annular sleeve or liner 74 may, and typically will, be fitted about the collar 72 or end portion 70 to enlarge its diameter.

It should be appreciated and understood that the width and especially the outer diameter of the sleeve or liner 74 may and will vary widely depending upon the inside dimension of the axle 20 being repaired, whereas the inside diameter of the sleeve or liner 74 will preferably be one of a few standard sizes that correspond with the outside diameter of the collar 72 (or end portion 70) of the spindle 40. This arrangement facilitates use of a small number of spindles 40 with various liners 74 having different outside diameters thereby greatly reducing inventory requirements.

At the end portion 70 of the spindle 40 or the collar 72, if present, is a female or re-entrant feature that cooperates with and is adapted to receive one or a pair of fasteners that releasably secure the spindle 40 within the axle 20. As examples of this feature, diametrically opposed and oriented horizontally within the collar 72 or the second (inner) end portion or region 70 of the spindle 40, and the liner 74 if utilized, are a pair of blind openings or, alternatively, a through opening 76A. These openings 76A align with openings or other features in the axle 20 as will be described subsequently. In the embodiments illustrated in FIGS. 9, 10 and 11, the female feature takes the form of a circumferential channel or groove.

Referring to FIG. 3, a seal ring 80 and an optional wear band 100 are illustrated. The seal ring 80 receives the replacement spindle 40 and facilitates secure installation in the axle 20. The seal ring 80 defines a short annular or cylindrical body 82 having an enlarged diameter region or collar 84 at one end. A circumferential surface 86 on the collar 84 provides either an oil seal surface which is contacted by an elastomeric seal (not illustrated) disposed on the wheel hub (also not illustrated) which seals in lubricant and seals out foreign matter or a surface which receives the wear band 100. The collar 84 also includes an oblique or frusto-conical surface 88 oriented at an angle of between approximately 20 degrees and 25 degrees and preferably 22.5 degrees. As illustrated in FIG. 1, a weld bead 98 is disposed between the oblique, frusto-conical surface 26 of the axle 20 and the oblique, frusto-conical surface 88 of the seal ring 80 as a final step of the repair process, described in greater detail below.

The seal ring 80 includes a through opening 90 which defines three distinct regions or surfaces which are complementary to regions or surfaces on the intermediate portion or region 60 of the spindle 40. Specifically, the seal ring 80 includes a tapered or frusto-conical center region or surface 92 having its larger diameter proximate the collar 84 or outboard end of the seal ring 80 and its smaller diameter distant the collar 84, i.e., proximate the inboard end of the seal ring 80.

At the outboard end of the frusto-conical center surface 92, proximate the collar 84, may be a first, larger annulus or band 94 of constant diameter the same as the diameter of the adjacent end of the frusto-conical center surface 92. At the end of the end of the frusto-conical center surface 92 distant the collar 84, i.e., proximate the inboard end of the seal ring 80, may be a second, smaller annulus or band 96 of constant diameter the same as the diameter of the adjacent end of the frusto-conical center surface 92. In FIG. 3, the angle of the taper of the center surface 92, as well as its length, have been enhanced to improve the clarity of and facilitate understanding of this feature of the invention. The axial length and taper angle of the center surface 92 are preferably equal to the axial length and taper angle of the first, shorter tapered region 62 of the intermediate portion or region 60 of the replacement spindle 40. The dimensions of the frusto-conical center surface 92 provide an interference fit with the first, shorter tapered region 62 of the intermediate portion or region 60 of the replacement spindle 40, as noted above.

Also illustrated in FIG. 3 is an annular wear band 100. The wear band 100 defines an "L" shaped cross section having an inner annular surface 102 having a diameter just slightly less than the outside diameter of the circumferential surface 86 of the seal ring 80 such that there is an interference fit between these surfaces. Heated slightly, the wear band 100 may be readily installed on the surface 86 of the seal ring 80 to provide a consumable and replaceable component that is exposed to frictional wear from an adjacent ball or roller bearing (not illustrated) and may be readily replaced.

The annular sleeve or liner 74 is illustrated in FIG. 4 and includes a pair of preferably diametrically aligned through openings 76B and an axial through opening 78 having an inside diameter equal to the outside diameter or the collar 72 (or end portion 70) of the spindle 40 with which it is utilized.

Figure 5:
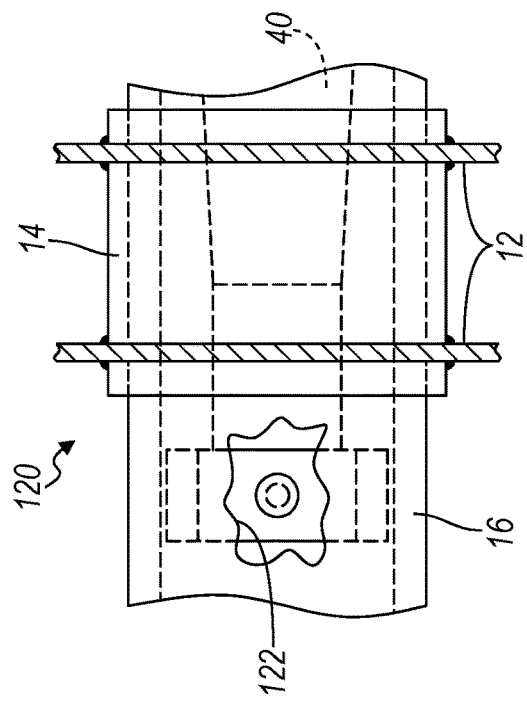
FIG. 5 is a fragmentary, top plan view with portions broken away of a first embodiment of an inboard (inner) end portion and fastener of a replacement spindle assembly according to the present invention.

Referring to FIG. 5, a first embodiment of an inboard spindle fastener assembly is illustrated and designated by the reference number 110. The first embodiment fastener assembly 110 includes a through bolt 112 which extends through horizontally opposed, i.e., at 3 o'clock and 9 o'clock, openings 114 in the circular portion 16 of the axle 20 and the openings 76A and 76B in the liner 74 and the collar 72 or the inner terminal portion of the spindle 40 and is secured by a nut 116. It will be appreciated that the openings in the circular portion 16 of the axle 20 may be accurately located by first measuring from the outer (terminal) end of the spindle 40 after installation, drilling a pilot hole, enlarging the pilot hole and using a drift pin, if necessary, to rotate the spindle 40 to align with the openings 114 during installation of the spindle 40 and the seal ring 80 assembly before the axle 20 cools and locks the assembly in place.

Figure 7:
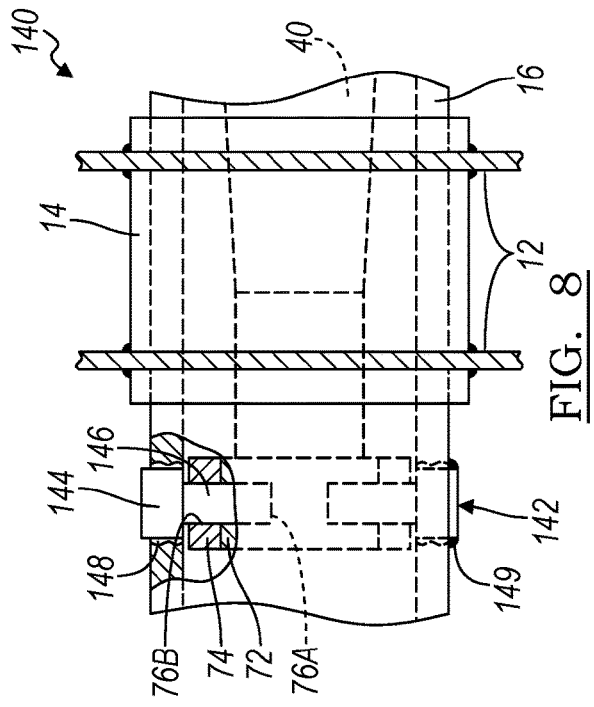
FIG. 7 is a fragmentary, top plan view with portions broken away of a second embodiment of an inboard (inner) end portion and fasteners of a replacement spindle assembly according to the present invention.
Figure 6:
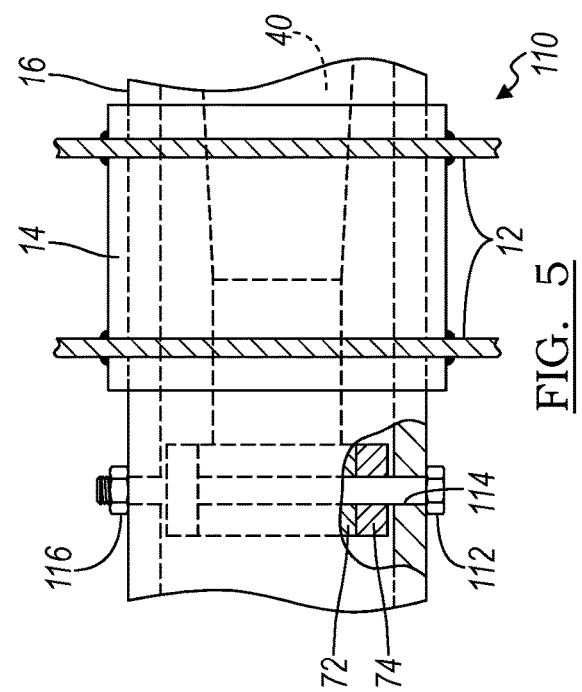
FIG. 6 is a fragmentary, side elevational view of a second embodiment of an inboard (inner) end portion of a replacement spindle assembly according to the present invention.

Referring now to FIGS. 6 and 7, a second embodiment of an inboard spindle fastener assembly is illustrated and designated by the reference number 120. The second embodiment fastener assembly 120 involves cutting or drilling two rough openings 122 at diametrically opposed locations, i.e., at 3 o'clock and 9 o'clock, in the circular portion 16 of the axle 20. Two cylindrical plugs 124 having axial openings 126 and defining curved inner faces 128 with radii equal to the outside diameter of the sleeve or liner 74 with which they are being utilized are tack welded to the sleeve or liner 74 and are then welded into place in the circular portion 16 of the axle 20 with a weld bead 130. Finally, a pair of bolts 132 are installed into the threaded openings 76B and 76A in the sleeve or liner 74 and the collar 72 or terminal portion 70 of the spindle 40.

It should be appreciated and understood that if the seal ring 80 provides an interference fit with the inside of the axle 20 such that it was heated during installation and thus that the spindle 40 is concentrically and securely mounted, a liner 74 need not be utilized. In this situation, the cylindrical plugs 124 may be somewhat longer than that illustrated in FIG. 7 in order to directly contact the end portion 70 of the spindle 40 or the collar 72 and be tack welded in place. Then, the bolts 132 will be installed in the openings 76A of the spindle 40 and the plugs 132 will be welded to the circular portion 16 of the axle 20 with the bead weld 130

Figure 8:
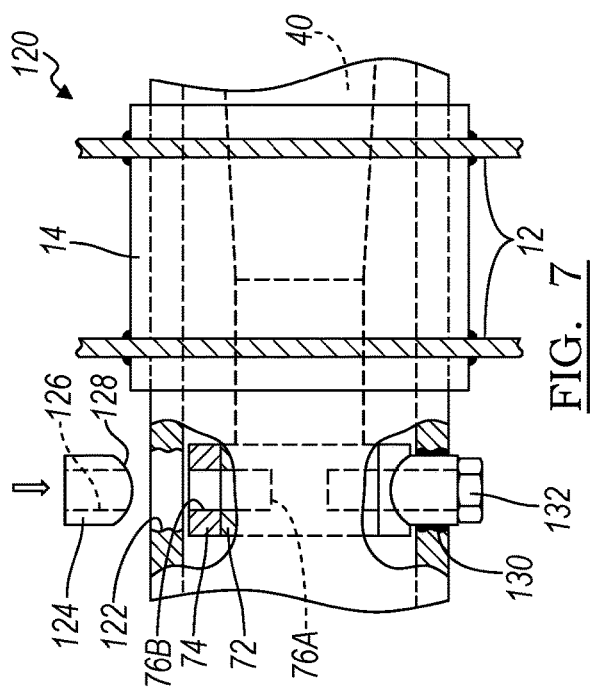
FIG. 8 is a fragmentary, top plan view with portions broken away of a third embodiment of an inboard (inner) end portion and fasteners of a replacement spindle assembly according to the present invention.

Referring now to FIG. 8, a third embodiment of an inboard spindle fastener assembly is illustrated and designated by the reference number 140. The third embodiment fastener assembly 140 includes one or preferably a pair of stepped plugs or pins 142 having a larger diameter straight. i.e., cylindrical, head 144 and a smaller diameter tapered shank 146. The heads 144 of the circular plugs or pins 142 are received within one or a pair of oversized and diametrically opposed openings 148 in the circular portion 16 of the axle 20 which may be drilled or torch cut. The tapered shanks 146 of the plugs 142 extend through the unthreaded openings 76B in the sleeve or liner 74 and into the straight holes or openings 76A in the collar 72 or the inner portion 70 of the spindle 40. The plugs 142 are driven in and retained by the tapers and interference fit between the tapered shanks 146 and the straight openings 76A in the collar 72 or the inner terminal portion of the spindle 40. After the plugs or pins 142 are fully seated, a weld bead 148 between the heads 144 and openings 148 in the circular portion 16 of the axle 16 is applied.

Referring now to FIG. 9, a fourth embodiment of an inboard spindle fastener assembly is illustrated and designated by the reference number 150. The fourth embodiment fastener assembly 150 is similar to the third embodiment fastener assembly 140 described directly above but utilizes a spindle 40' having a different configuration at the end portion 70 or collar 72'. The fourth embodiment fastener assembly 150 includes one or preferably a pair of stepped, cylindrical pins or plugs 152 with smaller diameter shanks 153 having parallel machined flats 154 which define a key. One or a pair of openings 156, preferably disposed in horizontal opposition, i.e., at 3 o'clock and 9 o'clock are drilled or torch cut in the circular portion 16 of the axle 20 to align with the openings 76B in the liner 74. The shanks 153 of the cylindrical drive pins or plugs 152 extend through the openings 76B in the liner 74 and are received within a circumferential channel or groove 158 formed in the collar 72' (or the end portion 70) of the spindle 40' with the flats 154 parallel to the walls of the circumferential groove 158.

As above, after installation, the drive pins or plugs 152 are secured in the circular portion 16 of the axle 20 with a bead weld 162.

Referring now to FIGS. 10 and 11, a fifth embodiment of an inboard spindle fastener assembly is illustrated and designated by the reference number 170. The fifth embodiment fastener assembly 170 also utilizes the spindle 40' and includes a curved, metal plate 172 having an inner radius matching the curvature of an outside surface 174 of the circular portion 16 of the axle 20 such that it uniformly and intimately contacts the outer surface 174. The curved plate 172 is preferably welded to the top, outside surface 174 of the circular portion 16 of the axle 20, i.e., at approximately 12:00 o'clock, by a peripheral weld bead 176. The curved plate 172 includes two threaded openings 178 which align with preferably threaded openings 182 in the circular portion 16 of the axle 20 as well as openings 76B in the liner 74. The two threaded openings comprising the openings 178 and 182 receive two threaded bolts or fasteners 184 having terminal unthreaded portions or shanks 186. The fifth embodiment 170, like the fourth embodiment 150, includes the circumferential channel or groove 158 formed in the collar 72 (or end portion 70) of the spindle 40'. When installed in the openings 178 and 182, the unthreaded portions or shanks 186 of the threaded fasteners 184 seat within the circumferential channel or groove 158, thereby retaining the spindle 40' within the circular portion 16 of the axle 20.

Referring now to FIG. 12, the initial steps of the method according to the present invention are illustrated. A generic axle 190 which may be either a tractor (drive) axle, often referred to as an axle housing or axle tube, or a trailer axle includes a brake flange or spider 192 and a friction weld 194 between the axle housing proper and a terminal spindle portion 196 that has been damaged. The damage may be stripped threads, spalled or worn bearing surfaces or deformation of the spindle portion 196 itself. Regardless of the damage, the spindle portion 196 is removed, preferably by sawing or cutting with suitable equipment such as a power metal cutting saw 198.

The second step of the repair method entails the machining or grinding of the end of the axle 190 to a chamfered or frusto-conical surface 202 having a reasonably smooth finish with an angle of between approximately 20 and 25 degrees to the axis of the axle 190, and preferably 22.5 degrees, as stated previously. A powered grinding wheel 204 may be utilized for this method step. Next, and optionally, depending upon the inside diameter of the axle 190, the condition of the axle 190 and the outside diameter of the body 82 of the seal ring 80 to be installed, boring the inside surface of the axle 190 may be necessary. This step is accomplished by a boring bar 206 having a cutter 208 which is aligned with the axis of the axle 190 and rotated to increase the diameter of an end adjacent portion of the axle 190. Note the bored out, end adjacent region in the axle 20 illustrated in FIG. 1.

Referring now to FIGS. 1, 2 and 3, the proper size spindle 40 and seal ring 80 are then selected. Since, as noted above, the seal ring 80 defines an interference fit on the spindle 40, it must first be heated and then installed on the spindle 40 from the inboard (inner) end. When the seal ring 80 is heated and installed, the complementary tapered surfaces 62 and 92 align, limit axial translation and properly position the seal ring 80 on the spindle 40. Next, the sleeve or liner 74 is installed on the collar 72 or inner end portion or region 70 of the spindle 40, the openings 76B in the liner and openings 76A in the collar 72 or inn end portion of the spindle 40 are aligned and the liner 74 is tack welded to the spindle 40 to maintain it in this position during installation.

This assembly is then installed in the axle 20. If the body 82 of the seal ring 80 is sized to provide an interference fit in the axle 20, the axle 20 is heated before such installation. Depending upon the choice of securement means selected, i.e., a through bolt 112 illustrated in FIG. 5, plugs 124 and bolts 132 illustrated in FIGS. 6 and 7, or taper pins 144 illustrated in FIG. 8 utilized with the spindle 40, or the plugs 152 and channel 158 illustrated in FIG. 9, or the curved plate 172, the fasteners 184 and the channel 158 utilized with the spindle 40' illustrated in FIGS. 10 and 11, the method steps will vary somewhat but are described above in connection with each particular embodiment.

Generally speaking, either before or after the installation of the spindle 40 and seal ring 80 into the axle, the necessary openings may be drilled or cut in the axle 20 which align with the channel or openings disposed in the liner 74 and the collar 72 or inner end portion 70 of the spindle 40 or the channel 158 of the spindle 40' according to the requirements of the individual embodiment, as noted above. A circumferential weld bead 98 between the chamfered end 26 of the axle 20 and the shoulder 88 of the seal ring 80 secures the seal ring 80 and spindle 40 within the axle 20.

The above described securement components facilitate removal and replacement of the spindle should it ever become damaged and require replacement. Such removal is essentially a two step process. First, the inboard or inner spindle securement means described above in connection with FIGS. 5 through 10 are removed by use of a saw, grinder or torch to release the inner end portion 70 of the spindle 40 or 40'. Next, a hydraulic tool is attached to the outer end or portion 50 of the spindle 40 and activated to provide force to overcome the interference fit between the seal ring 80 and the spindle 40 and withdraw the spindle 40 from the seal ring 80 and the axle 20.

Referring now to FIGS. 13 and 14, a tractor (drive) axle housing or drive tube is illustrated and generally designated by the reference number 220. The drive axle housing 220 may typically be of clamshell construction, having an upper, semi-circular half 222A and a lower, semi-circular half 222B which are joined along a weld line 224. A brake flange 226 may be secured proximate the outboard end of the axle housing 220 and a pair of U-bolts 228 attach the illustrated end of the axle housing 220 (as well as the opposite end) to suspension components of the vehicle (both not illustrated). A friction weld 230 joins the axle housing 220 to a spindle 234. The spindle 234 has been removed just outside the friction weld 230 according to the steps described directly above. The remaining end of the spindle 234 defines a chamfered surface 236 having a reasonably smooth oblique surface oriented at an angle of between 20 degrees and 25 degrees and preferably 22.5 degrees, as stated above.

Referring now to FIG. 14, a replacement spindle assembly 240 has been installed in the axle housing 220 according to the installation steps described directly above. The replacement spindle assembly 240 includes a spindle 242 having a through passageway 244 for a drive axle (not illustrated), a short seal ring 246, an optional wear band 248 and a fastener assembly 250 which may be any one of the several embodiments described above in connection with FIGS. 5 through 11. As described above in connection with FIG. 1, a weld bead 252 disposed between the chamfered surface 236 of the spindle 234 and a complementary chamfered surface 254 of the short seal ring 246 retains it and the replacement spindle 242 in the axle housing 220.

Referring now to FIGS. 15 and 16, an alternate embodiment replacement spindle is illustrated and generally designated by the reference number 260. The alternate embodiment replacement spindle 260 and method are similar to the embodiment described above in connection with FIGS. 13 and 14 except that an axle housing 262 (and damaged spindle) is cut off behind, i.e., inboard, of the friction weld. Thus, as illustrated in FIG. 15, the axle housing 262 includes an upper, semi-circular half 264A and a lower, semi-circular half 264B which are joined along a weld line 266, a brake flange 268, and a pair of U-bolts 272 which attach the axle housing 262 to suspension components of the vehicle (both not illustrated). An oblique, chamfered surface 276, oriented preferably at an angle of 22.5 degrees, defines the terminal portion of the axle housing 262.

Referring now to FIG. 16, the replacement spindle assembly 260 has been installed in the axle housing 262 according to the installation steps described above. The replacement spindle assembly 260 includes a spindle 282 having a through passageway 284 for a drive axle (not illustrated), a long seal ring 286, an optional wear band 288 and a fastener assembly 290 which may be any one of the several embodiments described above in connection with FIGS. 5 through 11. As described above in connection with FIG. 1, a weld bead 292 disposed between the chamfered surface 276 of the axle housing 262 and a complementary chamfered surface 294 of the long seal ring 286 retains it and the replacement spindle 282 in the axle housing 262. It will be appreciated that in comparison to the short seal ring 246 illustrated in FIG. 14, the long seal ring 286 illustrated in FIG. 16 extends further into the axle housing 262.

The description of the present invention is merely exemplary in nature and variations that do not depart from the gist of the present invention are intended to be within the scope of the present disclosure. Such variations are not to be regarded as a departure from the spirit and scope of the present disclosure.

What is claimed is:

1. A replaceable replacement spindle assembly comprising,
   an elongate spindle having a first, outer end portion, an intermediate portion and a second, inner end portion, said first, outer end portion including a threaded terminal portion, an outer bearing surface adjacent said threaded terminal portion and an inner bearing surface axially spaced from said outer bearing surface,
   said intermediate portion defining a first tapered region having a first taper angle, a larger diameter adjacent said first end portion and a second, smaller diameter distant said first end portion,
   said second end portion including at least one female feature,
   a seal ring having an outer end, an inner end, a collar proximate said outer end and a through opening, said through opening defining a second tapered region having a second taper angle, a larger diameter adjacent said outer end and a smaller diameter adjacent said inner end, said second taper angle of said second tapered region of said seal ring substantially the same as the first taper angle of said first tapered region of said spindle, and
   means for removably securing said second end portion of said spindle to a vehicle axle.

2. The replaceable replacement spindle assembly of claim 1, wherein said means for removably securing includes a bolt extending through said vehicle axle.

3. The replaceable replacement spindle assembly of claim 1, wherein said means for removably securing includes a pair of plugs secured to said vehicle axle and a pair of bolts extending through the axle and into said female feature of said second end portion.

4. The replaceable replacement spindle assembly of claim 1, wherein said female feature includes a pair of openings and said means for removably securing includes a pair of pins driven into said pair of openings.

5. The replaceable replacement spindle assembly of claim 1, wherein said second end portion of said spindle includes a cylindrical collar.

6. The replaceable replacement spindle assembly of claim 5, wherein said female feature is a circumferential channel and said cylindrical collar includes said circumferential channel.

7. The replaceable replacement spindle assembly of claim 1, further including a weld disposed between said collar of said seal ring and an end of said vehicle axle.

8. A replaceable replacement spindle assembly for a vehicle axle comprising,
- a spindle having a first end portion, an intermediate portion and a second end portion, said first end portion including a threaded terminal region, a first bearing surface adjacent said threaded terminal region and a second bearing surface spaced from said first bearing surface,
- said intermediate portion defining a first tapered surface having a first taper angle, a larger diameter adjacent said first end portion and a second, smaller diameter distant said first end portion,
- said second end portion including an enlarged region and at least one opening in said enlarged region,
- a seal ring having an enlarged diameter collar adjacent a first end and a through opening, said through opening defining a second tapered surface having a second taper angle, a larger diameter adjacent said first end and a smaller diameter distant said first end, said second taper angle of said second tapered surface of said seal ring substantially the same as the first taper angle of said first tapered surface of said spindle, and
- at least one fastener extending between said enlarged region of said second end portion of said spindle and said vehicle axle.

9. The replaceable replacement spindle assembly of claim 8 wherein said at least one fastener extends radially from said enlarged region of said second end portion of said spindle.

10. The replaceable replacement spindle assembly of claim 8, wherein said at least one fastener is a bolt extending radially through said enlarged region of said second end portion of said spindle and engaging said vehicle axle.

11. The replaceable replacement spindle assembly of claim 8, wherein said at least one fastener includes a pair of pins driven into a pair of openings in said enlarged region of said second end portion.

12. The replaceable replacement spindle assembly of claim 8, wherein said at least one fastener includes a pair of pins having shank portions and said at least one opening in said enlarged region of said second end portion defines a channel adapted to receive said shank portions of said pair of pins.

13. The replaceable replacement spindle assembly of claim 8, wherein said at least one fastener includes a pair of threaded fasteners having shank portions and further including a curved plate secured to said vehicle axle and having threaded openings adapted to receive said fasteners and said at least one opening in said enlarged region of said second end portion defines a channel adapted to receive said shank portions of said threaded fasteners.

14. The replaceable replacement spindle assembly of claim 8, further including a circular liner disposed about said enlarged region of said second end portion of said spindle.

15. The replaceable replacement spindle assembly of claim 8, further including a weld disposed between said enlarged diameter collar of said seal ring and an end of said vehicle axle.

16. A replaceable replacement spindle assembly comprising,
- a spindle having a first end portion, an intermediate portion and a second end portion, said first end portion including a threaded terminal region, a first bearing surface adjacent said threaded terminal region and a second bearing surface spaced from said first bearing surface,
- said intermediate portion defining a first tapered region having a first taper angle, a larger diameter adjacent said first end portion and a second, smaller diameter distant said first end portion,
- said second end portion including at least one opening,
- a seal ring having a collar at an outboard end and a through opening, said through opening defining a second tapered region having a second taper angle, a larger diameter adjacent said outboard end and a smaller diameter distant said outboard end, said second taper angle of said second tapered region of said seal ring substantially the same as the first taper angle of said first tapered region of said spindle, and
- at least one fastener extending between said second end portion of said spindle and a vehicle axle.

17. The replaceable replacement spindle assembly of claim 16 further including a liner disposed about said second end portion of said spindle, said liner including at least one through opening.

18. The replaceable replacement spindle assembly of claim 16 wherein said at least one opening in said second end portion of said spindle is a circumferential channel.

19. The replaceable replacement spindle assembly of claim 16 further including a wear band disposed on said outboard end of said seal ring.

20. The replaceable replacement spindle assembly of claim 16 further including a weld disposed between an oblique surface of said collar of said seal ring and an oblique surface on an end of said vehicle axle.

\* \* \* \* \*